United States Patent [19]
Gopalswamy et al.

[11] Patent Number: 5,845,752
[45] Date of Patent: Dec. 8, 1998

[54] MAGNETORHEOLOGICAL FLUID CLUTCH WITH MINIMIZED RELUCTANCE

[75] Inventors: Swaminathan Gopalswamy, Rochester Hills; Samuel Miller Linzell, Troy; Gary Lee Jones, Farmington Hills, all of Mich.

[73] Assignee: General Motors Corporation, Detroit, Mich.

[21] Appl. No.: 867,638

[22] Filed: Jun. 2, 1997

[51] Int. Cl.$^6$ .................................................. F16D 37/00
[52] U.S. Cl. .................... 192/21.5; 192/82 T; 188/267.2
[58] Field of Search ................. 192/21.5, 58.4, 192/82 T; 188/267.2, 268; 123/41.49

[56] References Cited

U.S. PATENT DOCUMENTS

| | | | |
|---|---|---|---|
| 2,543,394 | 2/1951 | Winther | 192/21.5 |
| 2,736,409 | 2/1956 | Logan | 192/21.5 |
| 2,804,955 | 9/1957 | Gill | 192/21.5 |
| 2,813,605 | 11/1957 | Buslik et al. | 192/21.5 |
| 3,250,341 | 5/1966 | Takahashi | 180/336 |
| 3,394,784 | 7/1968 | Searle | 192/21.5 |
| 4,227,861 | 10/1980 | LaFlame | 416/169 A |
| 4,285,421 | 8/1981 | Halsted | 192/84 C |
| 4,302,156 | 11/1981 | LaFlame | 416/169 A |
| 4,310,085 | 1/1982 | LaFlame | 192/58 B |
| 4,616,740 | 10/1986 | Okamoto et al. | 192/21.5 |
| 4,664,236 | 5/1987 | Stangroom | 192/35 |
| 4,787,489 | 11/1988 | Miyawaki | 192/21.5 X |
| 4,848,544 | 7/1989 | Ohkumo et al. | 192/21.5 X |
| 4,896,754 | 1/1990 | Carlson et al. | 192/21.5 |
| 4,920,929 | 5/1990 | Bishop | 123/41.49 |
| 4,957,644 | 9/1990 | Price et al. | 252/62.52 |
| 4,967,887 | 11/1990 | Annacchino et al. | 192/21.5 |
| 5,007,303 | 4/1991 | Okuzumi | 74/573 F |
| 5,007,513 | 4/1991 | Carlson | 192/21.5 |
| 5,054,593 | 10/1991 | Carlson | 192/21.5 |
| 5,090,531 | 2/1992 | Carlson | 192/21.5 |
| 5,137,128 | 8/1992 | Takei et al. | 192/21.5 |
| 5,524,743 | 6/1996 | Bullough et al. | 192/21.5 |
| 5,598,908 | 2/1997 | York et al. | 192/21.5 |
| 5,713,444 | 2/1998 | Schroeder | 192/21.5 |

OTHER PUBLICATIONS

Grau R. et al — The Magnetic Particle Clutch (A Versatile Control Element for Rocket Systems), Aerospace Engineering 1961.

Varadakumari, G. et al — Viscous torque of disc–type magnetic fluid slip clutches, IEE Proc., 1984.

Magnetic Particle Clutch, Automobile Engineer, May 1954 pp. 181–186.

Rabinow, J. — The Magnetic Fluid Clutch, AIEE Transactions, vol. 67, 1948.

Rabinow, J. — Magnetic–Fluid Control Devices, presented at the SAE National Transportation Meeting, Cleveland, 1949.

Ramakrishnan, S. et al — Theory and performance of the disc–type electromagnetic particle clutch under continuous slip service, IEE Proc., 1980.

*Primary Examiner*—Charles A. Marmor
*Assistant Examiner*—Saúl J. Rodriguez
*Attorney, Agent, or Firm*—Jeffrey A. Sedlar

[57] ABSTRACT

A magnetorheological fluid fan clutch effects modulated rotational motion transmission between a rotatable input shaft carrying an input clutch plate and a housing having a front cover and a rear cover forming a cavity about the input clutch plate wherein a core carried in the front and rear covers operates as output clutch plates. Bearings support the housing on the input shaft through the front and rear covers so that the input clutch plate is rotatable on the input shaft relative to the housing. Magnetorheological fluid is carried in the cavity, through which torque is variably transferred between the input clutch plate and the housing. A coil is positioned radially outside the non-magnetic spacer and carries a variable electrical current to effect a variable magnetic field across the input clutch plate and through the magnetorheological fluid providing modulated torque transmission between the input clutch plate and the core.

9 Claims, 1 Drawing Sheet

U.S. Patent  Dec. 8, 1998  5,845,752
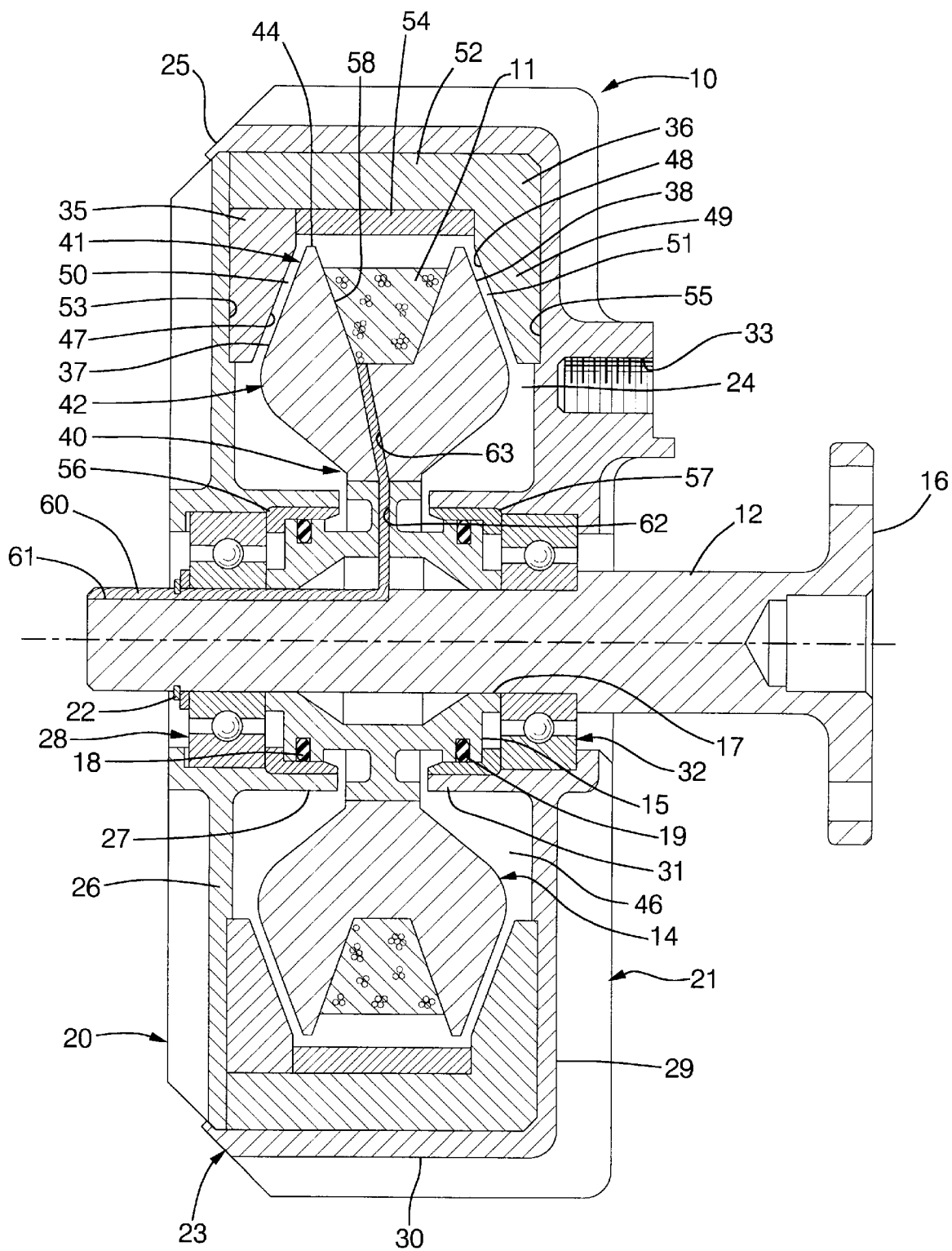

MAGNETORHEOLOGICAL FLUID CLUTCH WITH MINIMIZED RELUCTANCE

TECHNICAL FIELD

This invention relates to a magnetorheological fluid clutch with minimized reluctance and more particularly, to an engine driven cooling fan clutch having an optimized magnetic circuit and utilizing a magnetorheological suspension fluid for the modulated transmission of rotational motion from an input element driven by a vehicle engine to an output element connected to the cooling fan.

BACKGROUND OF THE INVENTION

A magnetorheological fluid is a suspension of finely powdered iron or iron alloy in a fluid such as mineral oil or silicone. A magnetorheological fluid clutch may consist of this type of fluid suspension carried between clutch plates, with an associated device providing a desired magnetic flux level across the clutch plates and the fluid. The clutch plates are typically made of a material with high magnetic permeability such as iron. When magnetic flux is generated across the clutch plates and through the magnetorheological fluid, the suspended particles respond. The response is embodied as an attraction between the clutch plates and the magnetorheological fluid particles. This characteristic phenomenon, combined with the internal magnetic attraction between the fluid particles, results in torque transmission between the clutch plates. In the past, magnetorheological fluid clutches have been referred to as magnetic particle fluid clutches. Many of the particle fluids used previously have been dry powders. With the development and use of suspensions of powders in a fluid medium such as mineral oil or silicone, studies were conducted into the rheology of particle fluids under a magnetic field, and consequently the terminology of magnetorheological fluids has been coined.

Drives for the cooling fans of cars and trucks initially comprised a simple solid shaft extending from a drive pulley to the fan. Subsequently, the art realized that the fan did not require continuous engagement. It is known that the power consumed by driving a fan is proportional to the cube of the fan speed, whereas the cooling rate is typically proportional to the square root of the fan speed. Therefore, it is expected that considerable improvement in power consumption and fuel economy can be achieved by controlling fan activation so that the fan is disengaged when operating conditions permit. This realization led to the development of disengageable fan drives.

Typical production cars most commonly use electrically driven fans for readily disengaging the fan. The fan is driven independent of the engine through an electric motor, and the electric motor is turned on or off as needed. These electric motors are typically rated for a maximum of a few hundred watts. The power requirements of a cooling fan for trucks typically reach up to several kilowatts. Therefore, an electric fan drive is not practical for higher cooling requirement applications such as trucks.

The disengageable fan drive most commonly used in higher cooling rate applications, is the viscous fluid clutch. Torque transmission is typically achieved by the viscous drag force between two grooved clutch plates shearing a thin layer of silicone oil. The viscous fluid clutch is often composed of two sections, one contains the clutch grooves and performs the shearing function, and the other acts as a reservoir for the silicone fluid. Silicone fluid passes from the reservoir to the clutch grooves through an orifice. A thermostat valve situated on the clutch senses the temperature of the air leaving the radiator, and correspondingly opens or closes the orifice. This in turn, fills or drains the clutch grooves with the silicone fluid, engaging or disengaging the clutch.

While the viscous fluid clutch represents a significant improvement over the solid shaft drive, it continues to have certain drawbacks. The common viscous clutch operates with bi-state capability meaning it can only be either completely engaged or completely disengaged. Engagement occurs at or near engine speed, even if the actual cooling requirement could be supplied at a lower speed. This results in inefficiencies by using more engine power for fan driving torque than may be required for the actual operating conditions encountered. The viscous fluid clutch also results in undesirable fan noise generation in many operating situations. The cyclic nature of thermostatic fan control causes the fan speed to oscillate, which can be particularly noticeable when the associated engine is at idle. The level of noise generation is typically proportional to the fifth or sixth power of the fan speed. Since the viscous fluid clutch is only bi-state, the fan speed is very high when the clutch is engaged resulting in increased noise generation. With a viscous fluid clutch, the temperature control system is also undesirably limited. A first limitation arises from the bi-state operational nature of the device, because the system provides only the two choices of maximum cooling or minimum cooling. A second limitation arises because the engine coolant temperature is indirectly sensed, from the air passing through the radiator. The resultant less than optimal temperature control, can lead to degraded engine performance and hunting of the fan clutch (resulting in more noise).

Providing adequate cooling is the key function of the radiator fan. The bi-state viscous fluid clutch only provides either maximum cooling or minimum cooling. Adding a means of modulating fan speed so that input torque is tailored to the amount of cooling required, avoids certain undesirable viscous fluid clutch characteristics. A modulating fan clutch controls the fan speed to achieve a constant cooling rate with the same total cooling as the cycling viscous fan clutch for every unit of time. Modulating control strategy reduces the maximum speeds that the fan operates at, potentially leading to improvements over the viscous fan clutch. For example, using existing relationships between fan speed, cooling rate, and fan power consumption, a modulating strategy can result in increases in engine operating efficiency. Reducing fan clutch driving load results in greater engine power availability. This becomes particularly significant in applications such as trucks, since the fan power consumption is of the order of several kilowatts at higher speeds, and is directly taken from the engine. Additionally, with reduced fan speeds, a significant reduction in fan noise is possible. Noise reduction is further achieved because of the elimination of the on and off cycling of the fan clutch.

Several types of fan drives designed to achieve fan speed modulation have been, and are being investigated by the automotive industry. While electric drives can be easily adapted to modulate the fan speed, they aren't practical in all applications. One other known manner of achieving fan modulation uses a hydrostatic drive unit between the engine and the fan. In this type of device, the engine drives a pump, and pressurized fluid from the pump drives a fluid motor with fluid flow control effected by valves. By controlling the fluid flow, the motor speed and the fan speed, are modulated. A hydrostatic drive offers the advantage of remote location of the fan with respect to the engine making it suitable for transverse engines. However, complexity and cost are associated drawbacks. The hydrostatic drives also typically suffer from undesirable inefficiencies, particularly when operated at partial loads.

Other types of modulating fan drives that have been investigated include the use of wet clutches that use controlled circulation of the silicone oil in the general viscous fluid clutch to modulate speed. Control difficulties and complexity are associated undesirable drawbacks with these methodologies. Packageability, simplicity, and the ability to smoothly control the torque capacity of a fan clutch continues to be an elusive combination of characteristics. Accordingly, the need for such a device continues to exist.

SUMMARY OF THE INVENTION

An aspect of the present invention, resides in providing a durable magnetorheological fluid clutch with minimized reluctance, embodied in a cost effective design as a solution to the aforementioned drawbacks associated with existing fan clutch devices. According this aspect, the solution utilizes controllability of the yield shear stress of a magnetorheological fluid to effect a modulated drive characteristic. A preferred aspect of the present invention, utilizes a uniquely mating structure to minimize reluctance with advantageous features contributing to desirable durability. Other aspects of the present invention are associated with the preferred structure for carrying out the aforementioned objectives. A magnetorheological fluid fan clutch according to these aspects preferably includes an input shaft connected with a separately formed input clutch plate carried on a non-magnetic seal housing. The input clutch plate is housed between front and rear covers that contain a quantity of magnetorheological fluid. The front and rear covers support the output element on the input shaft through an axially spaced bearing arrangement for durability. The front and rear covers carry a pair of magnetizable cores that operate as output clutch plates.

Preferably, these aspects are further achieved through the input clutch plate's shape, which positions the coil radially away from the center of the clutch to effect increased flux levels. Additionally, the input clutch plate, cores and covers provide adequate volume to ensure that the static level of the magnetorheological fluid is below the seals for improved life. Positioning the input clutch plate on a non-magnetic seal housing also contributes to enhanced seal life. The input shaft from the engine is connected to a single input clutch plate. This input clutch plate is enclosed by two output plates in the form of cores on either side, which are connected to the fan through the housing covers. Angled gaps between the input and output plates are filled with magnetorheological fluid under centrifugal force during operation.

According to a preferred embodiment of the present invention described in greater detail herein, a magnetorheological fluid clutch includes a rotatable input shaft with an input clutch plate engaged about the input shaft to rotate in concert therewith. The input clutch plate has a radially inner portion of minimal axial thickness, a radially outer portion of a larger axial thickness than the radially inner portion, and a radially middle section of a larger axial thickness than the radially outer portion. An annular groove is formed around an outer periphery of the input clutch plate with a coil positioned in the annular groove. The input clutch plate is positioned in a cavity formed by a housing having a front cover and a rear cover. A non-magnetic spacer is positioned between the front and rear covers and outer periphery of the input clutch plate. A first magnetizable core section is positioned at least partially between the front cover and the input clutch plate generally in the area of the input clutch plate between the radially middle section and the radially outer section. A second magnetizable core section is positioned at least partially between the rear cover and the input clutch plate generally in the area of the input clutch plate between the radially middle section and the radially outer section. A bearing supports the housing on the input shaft so that the input clutch plate is rotatable on the input shaft relative to the housing. Magnetorheological fluid is carried in the cavity through which torque is variably transferred between the input clutch plate and the housing. The coil carries a variable electrical current to effect a variable magnetic field across the input clutch plate and through the magnetorheological fluid to the first and second magnetizable core sections providing modulated torque transmission between the input clutch plate and the housing.

A magnetorheological fluid clutch according to a preferred aspect of the present invention includes a seal housing carried on the input shaft inside the input clutch plate so that the input clutch plate is fixed on the input shaft through the seal housing. The seal housing has a groove carrying a seal that seals the cavity. When the clutch is non-rotative, the magnetorheological fluid advantageously settles away from the seal in the cavity due to the minimal axial thickness of the input clutch plate at the radially inner portion. In a magnetorheological fluid clutch according to another preferred aspect of the present invention the input shaft has a groove, the seal housing includes a radial bore, and the input clutch plate includes an opening aligned with the radial bore so that a conductor extends to the coil through the groove, radial bore and opening. This provides the benefit of mounting the coil in a rotative manner on the input clutch plate.

BRIEF DESCRIPTION OF THE DRAWINGS

The present invention will now be described, by way of example only, with reference to the accompanying drawings, in which:

The FIGURE is a schematic cross sectional illustration of a fan clutch according to the present invention.

DESCRIPTION OF THE PREFERRED EMBODIMENT

Referring to the FIGURE, a magnetorheological fluid fan clutch assembly 10 is illustrated, and is adapted for using the torque transmission characteristics of the contained fluid, which are variable in response to a variable electromagnetic field. Clutch 10 is generally embodied as a single input plate design, with a rotating coil 11 supported on rotating input shaft 12 through input clutch plate 14. The input shaft 12 carries the single input clutch plate 14, which is made of a typical magnetically permeable material such as steel. The input shaft 12 is adapted to exhibit the same foot print at mounting flange 16 as commonly used existing viscous clutch, so that the magnetorheological fluid fan clutch 10 can be easily retrofitted to existing vehicle designs.

The input clutch plate 14 is manufactured separately from the input shaft 12, and the two are connected together for concerted rotation by an intermediate seal housing 15. The seal housing 15 is made of a non-magnetizable material such as aluminum or stainless steel preventing flux leakage from the clutch plate to the input shaft, advantageously maximizing the achievable torque capacity, and reducing any tendency to attract the fluid's suspended particles, which could lead to premature seal wear. The seal housing 15 is formed in a generally annular shape with an opening 17 that is closely received on the input shaft 12. Seal housing 15 is maintained on the input shaft 12 by a snap ring 22, and the input clutch plate 14 is preferably pressed onto, or fastened to, the seal housing 15 by a conventional means. A pair of annular grooves formed around the seal housing 15 contain the seals 18 and 19.

The input clutch plate 14 is housed between the front and rear covers 20 and 21 respectively, which comprise a housing 23 forming a cavity 24. The front cover 20 and rear cover 21 are attached together with a plurality of fasteners or through spin closure of the flange 25. Front cover 20 includes a finned front wall 26 with an integrally formed and rearwardly extending annular wall 27. The wall 27 rotatably supports the front cover 20 on the input shaft 12 through the bearing assembly 28. Wall 27 also engages an annular seal wear plate 56 with an L-shaped cross section, that bears against the seal 18 and the bearing assembly 28. Rear cover 21 includes a radially extending wall 29 with an integral forwardly extending wall 30 that engages the front cover 20. Wall 29 includes a forwardly extending annular wall 31 rotatably supporting the rear cover on the input shaft 11 through the bearing assembly 32. Wall 31 also engages an annular seal wear plate 57 with an L-shaped cross section, that bears against the seal 19 and the bearing assembly 32. The bearing assemblies 28, 32 are axially spaced and each includes inner and outer races that are engaged by an interposed series of balls for relatively free rotation of the housing 23 on the input shaft 12.

As a result, the housing 23, including front cover 20 and rear cover 21, is normally substantially free wheeling on the input shaft 12. The rear cover 21 also supports an associated fan (not illustrated) through a plurality of mounting openings, representative of which is opening 33. The rear cover 21 and front cover 20 are fabricated from an efficient thermally conductive material such as aluminum and are therefore, inadequate to conduct the magnetic field generated by the coil 11. Accordingly, the front and rear covers 20, 21 are adapted to carry a pair of core sections that act as the output clutch plates, and are made of conventional steel for magnetic permeability. The front core section 35 and the rear core section 36 are formed in two parts in the present embodiment for simplicity of assembly. However, the number of component parts of the front and rear core sections 35, 36 is not constrained and can easily be varied within the context of the present invention. The important aspect of the front and rear core sections 35, 36 is that they conduct the magnetic field generated by the coil 11 between the annular faces 37 and 38 of the input clutch plate 14.

The input clutch plate 14 includes a radially inner portion 40 of minimal axial thickness sufficient to engage the seal housing 15 and to provide the necessary mechanical strength for support during rotation. A radially outer portion 41, of a larger axial thickness than the radially inner portion 40 is provided near the outer periphery 44 of the input clutch plate 14. A radially middle section 42 of a larger axial thickness than the radially outer portion 41, is provided so that the annular faces 37, 38 are oriented at a substantial angle relative to the axis of the input shaft 12. The shape of the input clutch plate 14 provides a relatively large magnetic interface area at the faces 37, 38 and leaves a relatively large recess volume 46 near the radial inside of the cavity 24.

To mate with the input clutch plate 14, the front core section 35 generally comprises a ring with a rearward facing angled side 47 disposed substantially parallel to the face 37 and separated therefrom by a gap 50 that is disposed at a substantial angle relative to the rotational axis of the clutch 10. The core section 35 is set in a recess 53 formed in the front cover 20. Similarly, the rear core section 36 generally comprises a ring with a forward facing angled side 48 formed by wall 49 and disposed substantially parallel to the face 38 and separated therefrom by a gap 51 that is disposed at a substantial angle relative to the rotational axis of the clutch 10. Core section 36 is set in a recess 55 in rear cover 21, and also includes a cylindrically shaped wall 52 that is formed as one piece with the wall 49 and extends to the front cover 20. The radial inside of wall 52 contacts the front core section 35 for magnetic field transmission purposes. A cylindrical non-magnetic spacer 54 is positioned radially inside wall 52 and extends between wall 49 and front core section 35. The non-magnetic spacer 54 holds the core sections 35, 36 in the recesses 53, 55 respectively, and sets the spacing of the gaps 50, 51. Spacer 54 is not magnetizable, and therefore, not affected by magnetic fields. Spacing of the gaps 50, 51 is determined by the spacer 54 and the housing covers 20, 21. This permits manufacturing some of the other components of the clutch 10 to more liberal tolerancing standards.

Coil 11 comprises a plurality of turns of wire and is held in the annular groove 58 formed in the outer periphery 44 of rotating input clutch plate 14. A single wire lead 60 extends to the coil 11 through the groove 61 in input shaft 12, the radial bore 62 in seal housing 15, and the angled opening 63 in input clutch plate 14. The lead 60 is connected to one end of the coil 11 and the opposite end of the coil 11 is grounded to the input clutch plate 14. Electrical communication is established with the coil 11 through the use of common slip rings (not illustrated), engaged on the front end of input shaft 12. Magnetic flux generated by energization of the coil 11 is established through the input clutch plate 14 and the core sections 35, 36. The magnetic flux path includes the gaps 50, 51 in the cavity 24, which are critical to the present embodiment.

The cavity 24 is partially filled with magnetorheological fluid, so that when the clutch rotates, the centrifugal force pushes the fluid radially outward so that it covers the active clutch plate area. The active clutch plate area, is that defined around the gaps 50, 51. Accordingly, when the clutch 10 is rotating, fluid is forced radially outward and wets the faces 37, 38 and the sides 47, 48. This enables the fluid to be mostly out of contact with the seals 18, 19. During periods of non-rotation, the magnetorheological fluid settles downward under the force of gravity and away from the seals 18, 19 by being accumulated in the recess volume 46 of cavity 24 due to the minimal axial thickness of radially inner portion 40 of the input clutch plate 14.

Magnetorheological fluids comprising a suspension of solid particles in a selected liquid are known wherein the fluid's yield stress must be exceeded in order to initiate flow. When the fluid is exposed to a magnetic field the flow threshold yield stress increases as the flux density in the field increases. Yield stress is also known to increase as the volume fraction of solid particles in the suspension is increased. Accordingly, a desired yield stress for a selected magnetorheological fluid operating in a clutch can be achieved by controlling the volume fraction of suspended particles. Magnetorheological fluids useful as in the present invention are described in detail by commonly assigned U.S. patent application Ser. No. 08/629,249 entitled "Magnetorheological Fluids," filed Apr. 8, 1996, and which is specifically incorporated herein by reference. For purposes of the present invention, the magnetorheological fluid contained in cavity 24 carries a selected volume percent of solid particles that permits substantially complete slippage between the input clutch plate 14 and the output clutch plates comprising the cores sections 35, 36 as carried by the covers 20, 21 when the clutch is disengaged. A gradually increasing torque transfer is effected between input and output plates across the gaps 50, 51 as the clutch is engaging, and substantially complete coupling is provided when the clutch is fully engaged with minimal slippage between the input and output plates. The coil 11 is supplied with a variable current signal to establish a variable flux level through the electromagnetic portion of the device to vary the torque transfer level.

In accordance with the present invention, a magnetorheological fluid fan clutch provides the functional advantages of a modulating type fan drive in a relatively simple and cost effective design. The invention utilizes controllability of the yield shear stress of a magnetorheological fluid to effect a modulated drive characteristic. Packaging of the device to achieve desirable performance and physical characteristics according to aspects of the present invention is achieved through a confluence of structural features. The angular gaps 50, 51 maximize the flux transfer surface for minimized reluctance through the magnetorheological fluid while requiring the use of minimal amounts of core material.

We claim:

1. A magnetorheological fluid clutch comprising:

a rotatable input shaft;

an input clutch plate engaged about the input shaft to rotate in concert therewith, the input clutch plate having a radially inner portion of minimal axial thickness, a radially outer portion of a larger axial thickness than the radially inner portion and a radially middle section of a larger axial thickness than the radially outer portion, with an annular groove formed around an outer periphery of the input clutch plate;

a coil positioned in the annular groove;

a housing having a front cover and a rear cover forming a cavity about the input clutch plate;

a non-magnetic spacer positioned between the front and rear covers and the outer periphery of the input clutch plate;

a first magnetizable core section positioned at least partially between the front cover and the input clutch plate generally in the area of the input clutch plate between the radially middle section and the radially outer section;

a second magnetizable core section positioned at least partially between the rear cover and the input clutch plate generally in the area of the input clutch plate between the radially middle section and the radially outer section;

a bearing supporting the housing on the input shaft so that the input clutch plate is rotatable on the input shaft relative to the housing; and a quantity of magnetorheological fluid carried in the cavity through which torque is variably transferred between the input clutch plate and the housing wherein the coil carries a variable electrical current to effect a variable magnetic field across the input clutch plate and through the magnetorheological fluid to the first and second magnetizable core sections providing modulated torque transmission between the input clutch plate and the housing.

2. A magnetorheological fluid clutch according to claim 1 further comprising a seal housing carried on the input shaft inside the input clutch plate so that the input clutch plate is fixed on the input shaft through the seal housing, and the seal housing having a groove carrying a seal that seals the cavity wherein when the rotor is nonrotative, the magnetorheological fluid settles away from the seal in the cavity due to the minimal axial thickness of the radially inner portion of the input clutch plate.

3. A magnetorheological fluid clutch according to claim 1 wherein the input shaft includes a groove, the seal housing includes a radial bore and the rotor includes an opening intersecting the annular groove with a conductor extending to the coil through the groove, the radial bore and the opening.

4. A magnetorheological fluid clutch comprising:

a rotatable input shaft;

an input clutch plate engaged about the input shaft to rotate in concert therewith, the input clutch plate having a radially inner portion of minimal axial thickness, a radially outer portion of a larger axial thickness than the radially inner portion and a radially middle section of a larger axial thickness than the radially outer portion, so that the input clutch plate includes a forward angled face and a rearward angled face, and includes an annular groove formed around an outer periphery of the input clutch plate;

a coil positioned in the annular groove;

a housing having a front cover and a rear cover forming a cavity about the input clutch plate;

a non-magnetic spacer positioned between the front and rear covers and the outer periphery of the input clutch plate;

a first magnetizable core section positioned at least partially between the front cover and the input clutch plate generally in the area of the input clutch plate between the radially middle section and the radially outer section;

a second magnetizable core section positioned at least partially between the rear cover and the input clutch plate generally in the area of the input clutch plate between the radially middle section and the radially outer section and spaced from the first magnetizable core section by the non-magnetic spacer;

a pair of axially spaced bearings supporting the housing on the input shaft so that the input clutch plate is rotatable on the input shaft relative to the housing; and a quantity of magnetorheological fluid carried in the cavity, through which torque is variably transferred between the input clutch plate and the housing, wherein the coil carries a variable electrical current to effect a variable magnetic field across the input clutch plate and through the magnetorheological fluid to the first and second magnetizable core sections providing modulated torque transmission between the input clutch plate and the housing.

5. A magnetorheological fluid clutch according to claim 4 further comprising a seal housing carried on the input shaft inside the input clutch plate so that the input clutch plate is fixed on the input shaft through the seal housing, and the seal housing having a groove carrying a seal that seals the cavity wherein when the rotor is nonrotative, the magnetorheological fluid settles away from the seal in the cavity due to the minimal axial thickness of the radially inner portion of the input clutch plate.

6. A magnetorheological fluid clutch according to claim 4 wherein the input shaft includes a groove, the seal housing includes a radial bore and the rotor includes an opening intersecting the annular groove with a conductor extending to the coil through the groove, the radial bore and the opening.

7. A magnetorheological fluid clutch comprising:

an input shaft rotatable about an axis;

a non-magnetic seal housing fixed on the input shaft and having a first groove carrying a first seal and a second groove carrying a second seal;

an input clutch plate engaged on the seal housing to rotate in concert with the input shaft, the input clutch plate having a radially inner portion of minimal axial thickness, a radially outer portion of a larger axial thickness than the radially inner portion and a radially middle section of a larger axial thickness than the radially outer portion, so that the input clutch plate includes a forward angled face and a rearward angled face, and includes an annular groove formed around an outer periphery of the input clutch plate;

a coil positioned in the annular groove;

a housing having a front cover and a rear cover forming a cavity about the input clutch plate;

a non-magnetic spacer positioned between the front and rear covers and the outer periphery of the input clutch plate;

a first magnetizable core section positioned at least partially between the front cover and the input clutch plate generally in the area of the input clutch plate between the radially middle section and the radially outer section with a rearward facing angled side disposed substantially parallel to the forward angled face of the input clutch plate with a first gap formed between the rearward facing angled side and the forward angled face that is disposed at a substantial angle relative to the axis;

a second magnetizable core section positioned at least partially between the rear cover and the input clutch plate generally in the area of the input clutch plate between the radially middle section and the radially outer section, spaced from the first magnetizable core section by the non-magnetic spacer, and including a forward facing angled side disposed substantially parallel to the rearward angled face of the input clutch plate with a second gap formed between the rearward facing angled side and the forward angled face that is disposed at a substantial angle relative to the axis;

a pair of axially spaced bearings supporting the housing on the input shaft so that the input clutch plate is rotatable on the input shaft relative to the housing; and a quantity of magnetorheological fluid carried in the cavity, through which torque is variably transferred between the input clutch plate and the housing, wherein the coil carries a variable electrical current to effect a variable magnetic field across the input clutch plate and through the magnetorheological fluid to the first and second magnetizable core sections providing modulated torque transmission between the input clutch plate and the housing.

8. A magnetorheological fluid clutch according to claim 7 wherein when the rotor is nonrotative, the magnetorheological fluid settles away from the seal in a recess volume of the cavity due to the minimal axial thickness of the radially inner portion of the input clutch plate.

9. A magnetorheological fluid clutch according to claim 4 wherein the input shaft includes a groove, the seal housing includes a radial bore and the rotor includes an opening intersecting the annular groove with a conductor extending to the coil through the groove, the radial bore and the opening.

* * * * *